UNITED STATES PATENT OFFICE.

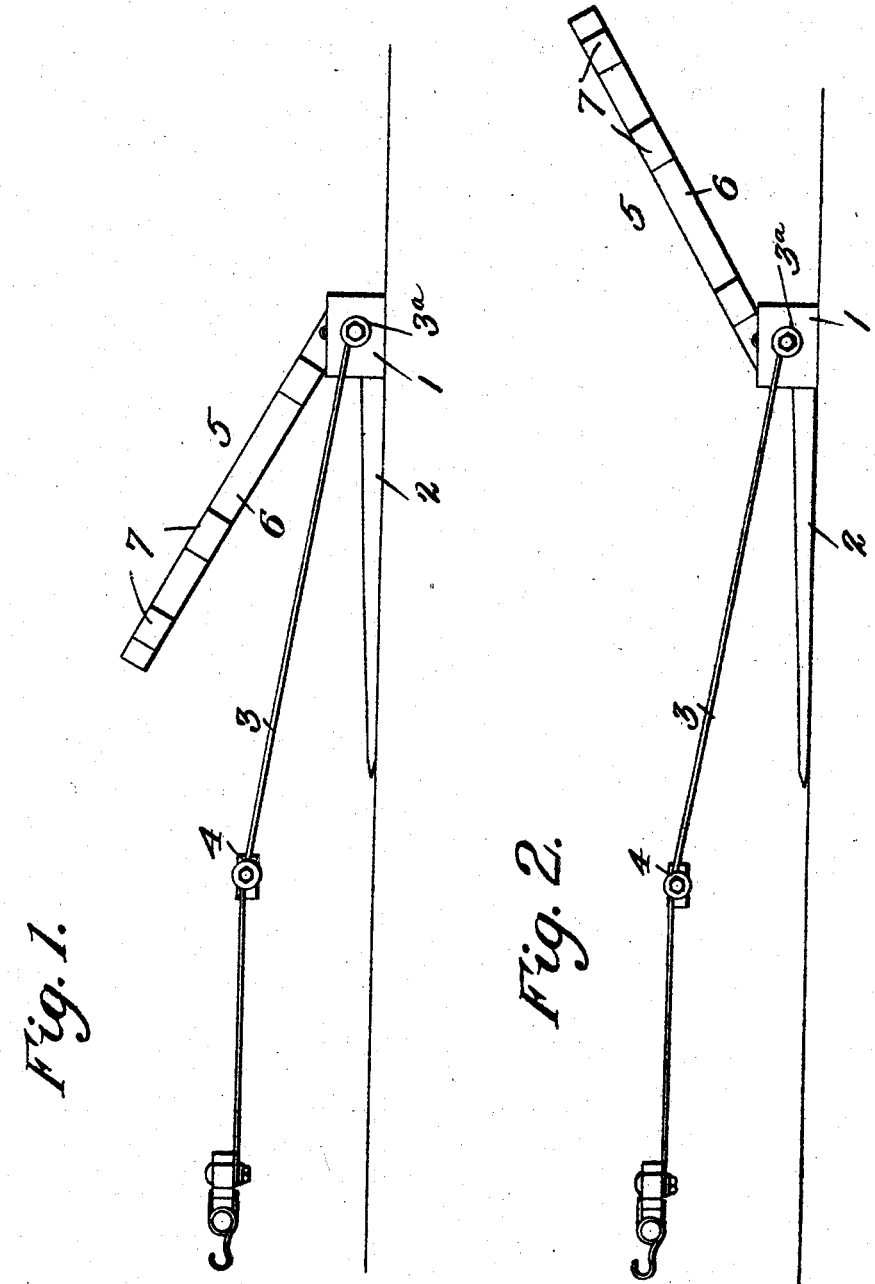

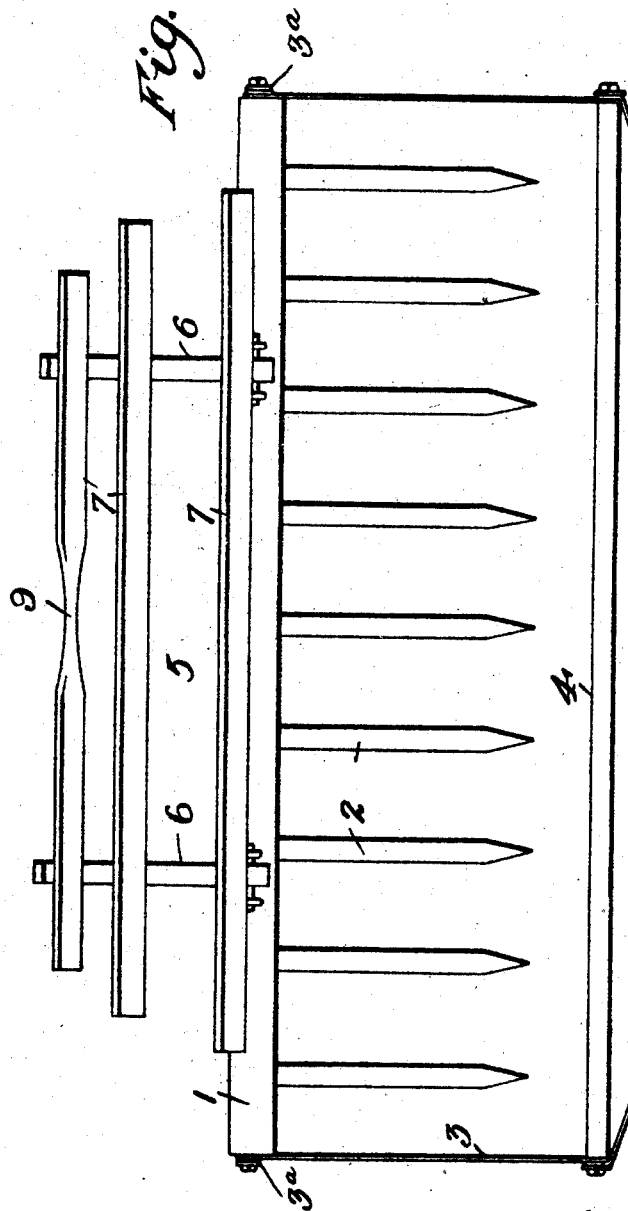
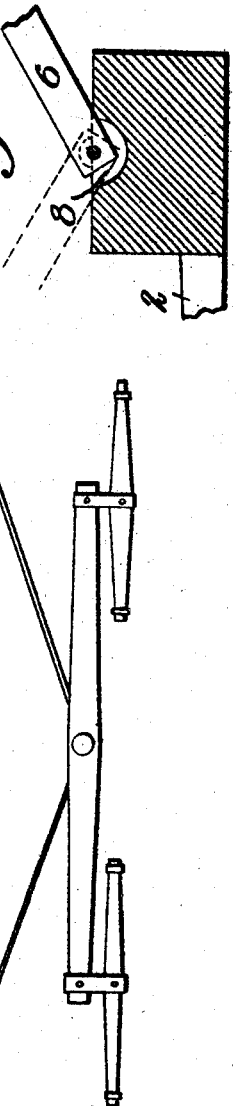

KISHIRO HOSHINO, OF KINGS COUNTY, CALIFORNIA.

HORSE-RAKE.

No. 928,517.      Specification of Letters Patent.      Patented July 20, 1909.

Application filed April 13, 1909. Serial No. 489,550.

*To all whom it may concern:*

Be it known that I, KISHIRO HOSHINO, a subject of the Mikado of Japan, residing in Kings county, State of California, have invented certain new and useful Improvements in Horse-Rakes, of which the following is a specification.

My invention relates to rakes for gathering weeds, brush, hay and the like, of the drag class, and has for its object the improvement of rakes of this class by adding thereto a rack pivotally secured to the cross beam and arranged to be thrown over the prongs of the rake when starting to load it and by its weight serving to hold the points of the prongs down, and as the loading continues the rack is lifted as the amount of material increases and finally falls over backwardly so as to receive the material as it is crowded back from the rake. The journals of the rack are formed with stops to limit the swing of the rack to an arc of substantially 120 degrees, ending about 30 degrees above the prongs when in its forwardmost position and about the same angle to the ground when in its rearwardmost position.

The construction and operation of my improved rake will be described hereinafter and illustrated in the accompanying drawings in which—

Figure 1 is a side view of my improved rake showing the rack in its forwardmost position, Fig. 2, a similar view showing the rack in its rearwardmost position, Fig. 3, a top plan view showing the rack in the position shown in Fig. 2, and Fig. 4, a detail view of one of the hinges.

In the drawings similar reference characters indicate corresponding parts in all of the views.

The cross beam 1 of my improved rake has the prongs 2 secured thereto and the rake is pulled by means of a chain or cable 3 swivelly secured to the ends of cross beam 1 as shown at 3ª and provided with a spreader bar 4.

Pivotally secured to the top of cross beam 1 is a rack 5 consisting of posts 6 and rails 7 which may be graduated in length, as shown, or not as desired. The cross beam 1 is provided with sockets 8 to receive the ends of posts 6, where pivoted to the cross beam, as stated, and the front and rear edges of the sockets by engaging the posts serve to limit the forward and rearward swinging of the rack 5 to an arc of substantially 120 degrees as stated above. The middle of the outer rail 7 of the rack is formed with a hand hold 9.

In operation the draft animals are hitched to the chain or cable 3. When the rake is started the rack 5 is thrown over forward, the front edges of sockets 8 engaging posts 6 so that the rack is above the prongs 2 at an angle of about 30 degrees thereto. The weight of the rack when in this position serves to hold the ends of prongs 2 down so that they scrape the ground and pass under the material being raked. As the material on the rake increases and engages the rack it is gradually lifted until it passes the perpendicular when it falls over backwardly until the posts 6 engage the rear edges of sockets 8 which hold the rack at an angle of about 30 degrees to the ground and forms with the prongs 2 a scoop-like receptacle for the raked material that is gradually pushed back on to the rack as the prongs gather the material off the ground. When the rack is in its rearwardmost position and is loaded the prongs may if necessary be held against the ground by lifting on the rack by grasping hand hold 9, and when the rack and prongs are loaded they constitute a scoop for transporting the material to be dumped, the prongs being lifted from engagement with the ground by depressing the outer end of the rack so that the device rides on cross beam 1. To dump the material the outer end of the rack is raised sufficiently to cause the points of the prongs to catch in the ground, when by pulling the rake forward it is overturned. When the device is overturned the outer ends of the posts 6 catch into the ground and the continuation of the forward movement of the team drags the rake forward, pulling the prongs out of the load and finally landing the rake in its proper position for taking another load. When returning with the rake to the place where it is to be loaded again the rack may be thrown back into its rearmost position so that its weight will elevate the prongs to prevent them from catching in the ground and the device will ride on cross beam 1.

Having thus described my invention what I claim is—

1. In a horse rake, in combination with a cross-beam, and prongs secured thereto, a rack pivotally secured to the cross-beam.

2. In a horse rake, in combination with a cross-beam, and prongs secured thereto, a rack pivotally secured to the cross-beam, and means to limit the pivotal movement of the rack.

3. In a horse rake, a cross-beam having sockets in the upper side, and prongs secured to the cross-beam, a rack having end posts pivotally secured in said sockets, the front and rear edges of the sockets engaging said posts to limit the pivotal movement of the rack.

4. A horse rake comprising a cross-beam having sockets in its upper side, prongs secured to said cross-beam, a rack having end posts pivotally secured in said sockets, the front and rear edges of the sockets engaging said posts to limit the pivotal movement of the rack, a draft appliance consisting of a flexible member swivelly secured to the ends of the cross-beam, and a spreader bar secured to the flexible member.

In testimony whereof I hereto affix my signature in the presence of two witnesses.

KISHIRO HOSHINO.

Witnesses:
J. C. C. RUSSELL,
AMOS ELLIOTT.